Feb. 7, 1933.　　　　　J. ROBINSON　　　　　1,896,917
AUTOMATIC TRAIN PIPE CONNECTER
Original Filed Feb. 26, 1929　　2 Sheets-Sheet 1
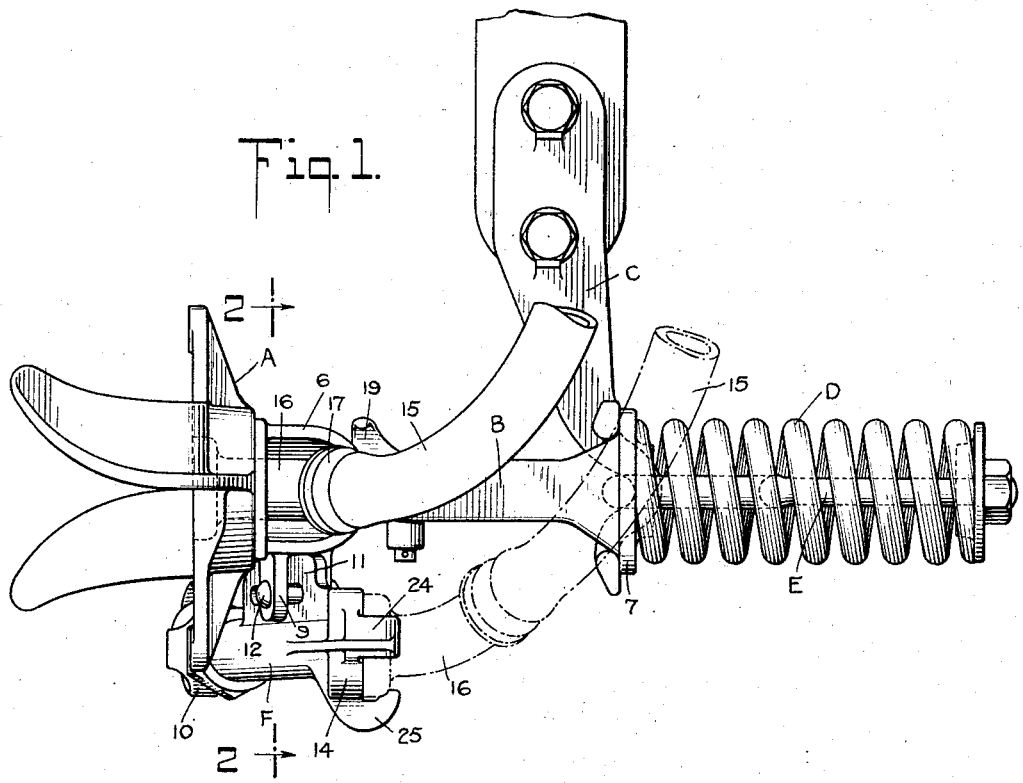
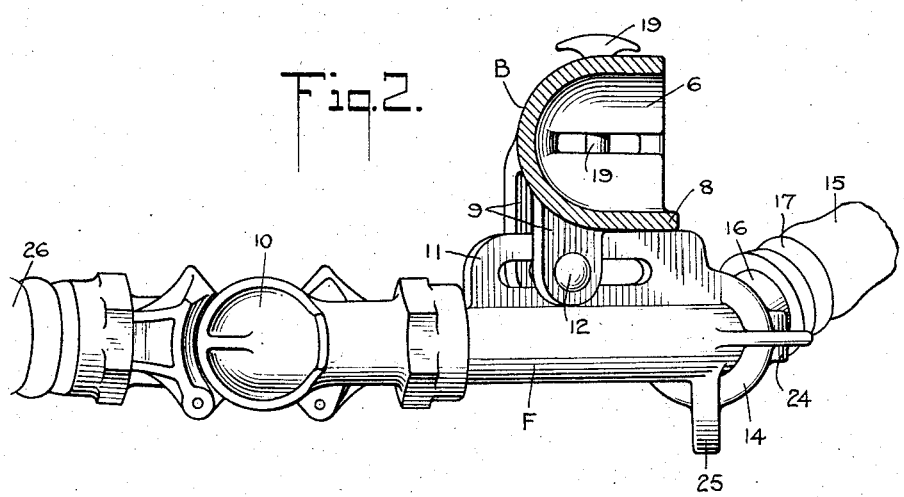
INVENTOR
Joseph Robinson
BY
Watson, Coit, Morse & Grindle
ATTORNEYS

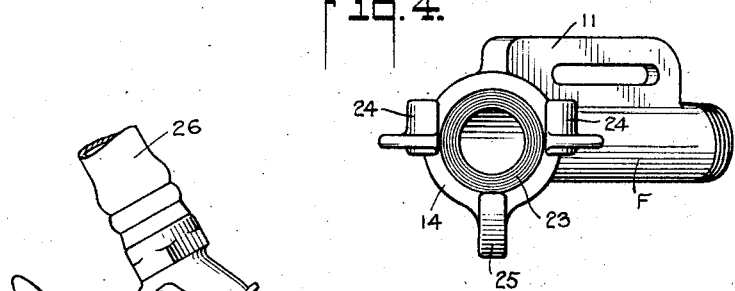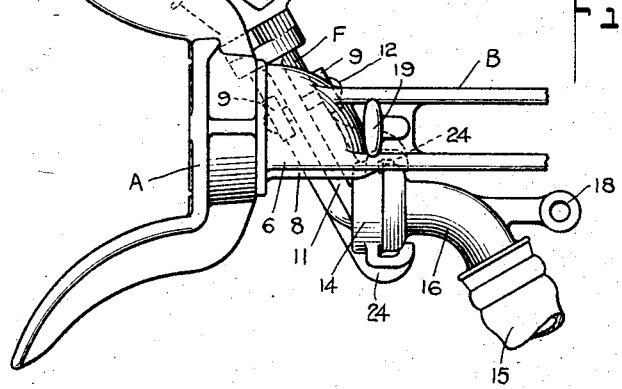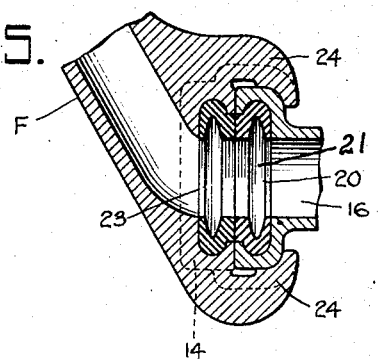

Patented Feb. 7, 1933

1,896,917

UNITED STATES PATENT OFFICE

JOSEPH ROBINSON, OF NEW YORK, N. Y.

AUTOMATIC TRAIN PIPE CONNECTER

Application filed February 26, 1929, Serial No. 342,686. Renewed May 5, 1932.

This invention relates to automatic train pipe connecters for railway cars, and particularly to devices for interchangeably connecting such connecters with the hose of cars not equipped with them.

Numerous forms of devices for this purpose have heretofore been made. Some of them are built into the automatic connecter and are a permanent part of it. That arrangement introduces extra air joints into the connecter, and complicates its construction throughout the whole period of its life, even though the necessity for an interchange may have passed. An example of this type of construction is shown in the patent to Joseph E. Forsythe, No. 1,360,631, November 30, 1920. Other forms of interchange devices are separate from the connecter itself, and are carried on some part of the car. An example of this construction is shown in applicant's United States Patent No. 1,245,799, November 6, 1917. Trainmen must fetch this interchange to the point where it is to be used, which sometimes involves walking the greater part of the length of a freight train, causing expensive delays. This form of interchange, or "dummy" as it is generally called, is frequently lost. In addition to its inconvenience, it introduces an extra gasket and a union into the connecter proper, which means extra parts, extra cost, and extra air joints to be maintained, during the whole life of the connecter itself.

In the present invention all these objections are effectually eliminated. No extra air joints of any kind are introduced into the connecter proper. Although the interchange is always with the connecter ready for instant use, it is not a permanent part of the connecter, and may be readily discarded when the transition period is over, leaving the connecter as free from complication as if interchange had never been anticipiated.

Other objects of my invention are to provide an interchange device which will adjust itself transversely and longitudinally of the connecter to accommodate the train pipe hose to the running in and out movement of the cars, and thus avoid excessive strain on the hose. Another object is to simplify the connection between the connecter hose and the interchange device, by eliminating from that connection all movable parts, and by packing the joint with opposing gaskets which automatically seal under the pressure of the fluid carried. A further object is to employ the air pressure, and the weight of the lower end of the house and the fitting therein, to maintain the parts firmly locked together when in the service position. A still further object is to support the interchange on the automatic connecter so that it is always held out of undesired contact with the connecter hose and its fitting, thus avoiding abrasion of these parts due to the interchange device rubbing against them when not in use. The interchange device is hinged or anchored to the automatic connecter in such a way that it may freely swing to the most advantageous positions for connecting the hand hose couplings when making interchange, and for releasing them when cars in interchange are parted without first disconnecting these couplings.

Other objects and advantages of my invention will appear from the following specification and drawings in which Figure 1 is a side elevation of an automatic connecter provided with my improved interchange device. In this view the upper part of the train pipe hose 15 is broken away, and the car coupler is not shown.

Figure 2 is a front sectional view taken on the line 2—2 of Figure 1. In this view my improved interchange is shown in the service position.

Figure 3 is a plan view of the construction shown in Figure 1, with certain parts omitted. In this view the interchange device is also shown in the service position.

Figure 4 is a front elevation of the shank F of my improved interchange device, and Figure 5 is a sectional plan view showing the expansible gaskets which seal the joint between the connecter hose fitting 16 and the interchange shank F.

Referring now to the drawings:

I show my improvement attached to a well known form of automatic train pipe connecter, consisting of a coupling head A, and a support or body member B having a hollow forward end 6 pressed through or otherwise secured to the coupling head. On the bracket C, which is suitably attached to the car coupler, the support B and head A are yieldingly mounted for universal movement by means of a spiral buffer spring D, and an anchor member or tie rod E. The rod embraces the lower end of the bracket and anchors the spring thereto, under pressure, with the flange 7 of the pipe interposed between the front end of the spring and the rear face of the bracket and normally yieldingly held against the latter by the spring. The lower side of the forward end 6 of the support is provided with a laterally extending projection 8 on the opposite side of the longitudinal center line of the support. Formed integrally therewith, and with the projection, I provide a pair of downwardly extending lugs 9, which are staggered on the support obliquely to the longitudinal direction of the latter. To these lugs I flexibly anchor or tie my improved interchange device or coupling member, which consists of a hollow shank F threadingly connected to or formed integral with the usual hand hose coupling 10. The shank is provided with an elongated upwardly extending boss or web 11 slotted through most of its length as shown. The lugs 9 are spaced a substantial distance apart and are perforated also obliquely to the lengthwise direction of the support B. A pin or rivet 12, or other form of rugged permanent connection, passes through the lugs, and the boss 11, and flexibly ties or "links" the interchange device permanently to the connecter. The upper edge of the web 11 engages the under side of the support, or the projection 8 (see Figure 2), to hold the front end 14 of the interchange out of contact with the train pipe hose 15 and the fitting 16 when the interchange device is not in use. The proportion of these parts is such that when the web 11 is in engagement with the bottom of the pipe, the hand hose coupling 10 will occupy the vertical and lateral positions most advantageous for readily making good connection with the hose of the unequipped car, whilst the connection of the interchange shank F with the support B is such as to permit free transverse and longitudinal shifting of the shank F relative to the support to fully accommodate the train pipe hose 15 and 26 to the running in and out movement of the cars in interchange. When cars "run out" in service—that is when the draft gear slack is taken up as in starting the train—the distance between the ends of the opposing cars increases considerably. At such times it is most important that the connection between the interchange device and the automatic connecter shall be such as to permit the connected hose to freely accommodate themselves to the relative and varying lengthwise movement between the cars. Without this provision the interchange connection wiuld be entirely broken, or would be opened to such an extent as to cause leakage setting the brakes. My invention makes this necessary essential provision.

In the lower end of the hose 15, I suitably mount a curved fitting or conduit 16, as by a clamp 17. The fitting normally lies in the hollow of the support B and extends through the coupling head A. It is provided with a perforated lug 18 through which a plunger pin 19 extends to hold the fitting in the pipe and head. The construction of this plunger pin is similar to that described and illustrated in my co-pending application Serial No. 287,250, filed June 21, 1928. The forward end of the conduit 16 is provided with an interior annular groove in which is mounted a resilient expansible gasket 20, the gasket being expanded by the pressure of the fluid entering the annular groove 21 formed in the flange of the gasket. The front end or head 14 of the interchange shank F normally occupies a plane at a right angle to the longitudinal direction of the support B, whilst the body of the shank F extends obliquely to such direction of the pipe, as shown particularly in Figure 3. The head 14 of the shank is provided with an annular groove and a gasket 23 in all respects a substantial duplicate of the gasket in the conduit 16. Spaced lugs 24 and 25, formed preferably integrally with the head 14, extend forwardly therefrom and curve inwardly thereof, to receive the forward end of the conduit 16. Their function is to lock the conduit in the head 14 with the gaskets 20 and 23 accurately aligned, as shown particularly in Figures 3 and 5. The lugs are so spaced that the conduit 16 is set down into them from one side of the head 14, preferably the top, the lug 25 serving as a stop in connecting the parts, while the lugs 24 prevent undesired lateral movement of the conduit 16 in its connection to the shank F. The conduit 16 is free, however, to rotate in the lugs to best accommodate the train pipe hose to the position of the connected cars, and to the location of their train lines, which are not always uniform.

To put a car not equipped with an automatic connecter into interchange communication with a car having an automatic connecter equipped with my improved interchange device, the hose 26 of the unequipped car is preferably first connected to the coupling 10 of my improvement, the coupling 10 being rotated upwardly on the pin 12, to bring it into locking engagement with the coupling on the hose 26. The plunger pin 19 is then lifted and the conduit 16 removed from the support B, and the coupling head A, and its forward end is passed downwardly into the lugs 24 and 25, which operation brings the gaskets 20 and 23 into alignment. When the air is turned on it enters the grooves in these gaskets and forces their faces tightly together making a constantly leakproof joint. The weight of the lower end of the hose 15 and the conduit 16, hold the latter in locked position in the interchange device even when there is no air pressure in the hose. Immediately the air is turned on, the hose tends to straighten out which firmly draws the conduit 16 always downwardly in its seat on the interchange shank F.

What I claim is:

1. In combination with an automatic train pipe coupling head and a support therefor, of a coupling member comprising a tubular shank extending across the longitudinal center line of the connecter and carrying on one side of said center line an ordinary hand hose coupling, and on the opposite side of said center line a seat for receiving a conduit, a conduit on said seat and connected with the train pipe hose, spaced lugs adjacent said seat having portions which embrace one end of said conduit, means for flexibly connecting said hollow shank to said support, and a projection extending laterally away from a lower edge of said support for engaging a lug on said coupling member to hold the member out of contact with said conduit when the parts are not in interchange connection.

2. A construction of the kind described, comprising in combination with a connecter head support, a tubular coupling member, means for connecting said member to said support with the axis of the member arranged diagonally to the longitudinal length of the support, said connecting means including interengaging parts carried respectively by said member and said support, said parts being pivotally connected to each other and the part carried by said member being slidable relative to the part carried by said support in a direction transverse to the longitudinal length of said support, and means at each end of said member for connecting a train pipe hose thereto.

3. A construction of the kind described, comprising in combination with a connecter head, a support therefor, a tubular coupling member, means connecting said member to said support with the axis of the member arranged transversely to the longitudinal length of the support, said connecting means including a part carried by said member and a part carried by said support, said last named part being slidable relative to said first named part in a direction transverse to the longitudinal direction of said support, and means on each end of said member for connecting a train pipe hose thereto.

4. A construction of the kind described, comprising in combination with a connecter head support, a tubular coupling member arranged diagonally of the longitudinal length of said support, connecting means between said member and said support, said connecting means including a part carried by said support and a part carried by said member, one of said parts being slotted with the slot thereof extending transversely of the longitudinal length of said support and the other part slidably and pivotally engaging said slot, whereby said member may pivot relative to said support and slide transversely thereof and means on each end of said member for connecting train pipe hose thereto.

5. A construction of the kind described, comprising, in combination with a connecter head support, a tubular coupling member, means connecting said member to said support with the axis of the member arranged diagonally to the longitudinal length of the support, said connecting means including a pin and slot connection between said member and said support, whereby said member may pivot and slide relative to said support, and means on each end of said member for connecting a train pipe hose thereto.

6. A construction of the kind described, comprising, in combination with a connecter head support, a tubular coupling member carried by said support, said member being arranged diagonally of said support, one of said last named parts having a pin mounted thereon, the other of said parts having a boss extending transversely of the longitudinal length of said support and provided with a slot in which said pin slidably and pivotally engages, whereby pivotal and slidable motion of said member relative to said support is permitted, and means on each end of said member for connecting a train pipe hose thereto.

7. A construction of the kind described, comprising, in combination with a connecter head support, a tubular coupling member carried by said support, said member being arranged diagonally of said support, a pair of spaced lugs connected to said support, a pin extending between said lugs, a boss connected to said member intermediate the ends thereof and provided with a slot through which said pin extends, whereby said member is pivotally and slidably connected to said support, and means on each end of said member for connecting a train pipe hose thereto.

8. A construction of the kind described, comprising, in combination with a connecter head support having spaced lugs extending downwardly from the lower side thereof, a pin extending between said lugs, a tubular coupling member arranged beneath and diagonally of said support, said member having a slotted boss arranged between said lugs with said pin extending through said slot, whereby said member is pivotally and slidably connected to said support, and means on each end of said coupling member for connecting a train pipe hose thereto.

9. A construction of the kind described, comprising in combination, a connecter head support and a tubular coupling member, co-operating means on said support and said member for connecting the member to said support and maintaining the former in position with its axis diagonal to the longitudinal length of the connecter, said means including a pin carried by said support diagonally to the longitudinal length thereof and a part carried by said member having a slot through which said pin extends whereby said member is free to pivot and slide relative to said support and means at each end of said member for connecting a train pipe hose thereto.

10. A construction of the kind described, comprising, in combination, a connecter head support and a tubular coupling member, means for pivotally and slidably connecting said coupling member to said support, said tubular member having at each end means for connecting a train pipe hose thereto.

11. A construction of the kind described, comprising, in combination, a connecter head support and a tubular coupling member arranged beneath said support, means for pivotally and slidably connecting said member to said support, said tubular member having at each end means for connecting a train pipe hose thereto.

12. A construction of the kind described, comprising, in combination, a coupling head support and a tubular interchange member, one of said parts having a slotted portion extending transversely of the longitudinal direction of said support, the other one of said parts having a portion engaging in said slot, whereby said tubular member is movable transversely of the longitudinal axis of said support, and means on each end of said member for connecting a train pipe hose thereto.

13. A construction of the kind described, comprising, in combination, a connecter head support, a tubular coupling member arranged beneath said support, one of said parts having a slotted portion arranged transversely of the longitudinal axis of said support and the other one of said parts having a portion slidably received in said slot, whereby said coupling member can slide transversely of the longitudinal axis of said support, and means at each end of said member for connecting a train pipe hose thereto.

In testimony whereof I hereunto affix my signature.

JOSEPH ROBINSON.